United States Patent [19]
Lawrenson

[15] 3,700,786
[45] Oct. 24, 1972

[54] MULTI-CONDUCTOR ELECTRIC CABLES
[72] Inventor: Thomas Lawrenson, Helsby, via Warrington, England
[73] Assignee: British Insulated Callender's Cables Limited, London, England
[22] Filed: Feb. 29, 1972
[21] Appl. No.: 230,325

[30] Foreign Application Priority Data
March 3, 1971 Great Britain............5,905/71

[52] U.S. Cl................174/72 A, 156/51, 174/113 R, 174/115, 174/117 F
[51] Int. Cl.............................................H01b 7/08
[58] Field of Search.....174/71 R, 72 R, 72 A, 72 TR, 174/84 R, 113 R, 115, 117 R, 117 F, 117 FF, DIG. 8, 110 V; 156/51, 52, 53, 54, 55, 56

[56] References Cited

UNITED STATES PATENTS

| 3,634,808 | 1/1972 | Morrison..............174/117 FF |
| 3,627,903 | 12/1971 | Plummer................174/117 F |
| 3,524,921 | 8/1970 | Wolf.....................174/117 FF |
| 3,079,458 | 2/1963 | Hedstrom.........174/117 FF X |
| 3,048,651 | 8/1962 | Howard et al. .......174/DIG. 8 |
| 2,299,140 | 10/1942 | Hanson....................174/72 A |

FOREIGN PATENTS OR APPLICATIONS 765,705   1/1957   Great Britain........174/DIG. 8

Primary Examiner—Lewis H. Myers
Assistant Examiner—A. T. Grimley
Attorney—Eugene F. Buell et al.

[57] ABSTRACT

A multi-conductor cable for forming a cable harness, for instance for use in automobiles or aircraft, comprises at least one length of tape cable enclosed in a heat-shrunk tubular sheath of insulating material. At least one branch length of tape cable is electrically connected to the length of tape cable, or to at least one of the lengths of tape cable, at at least one of a number of longitudinally spaced locations, the free end of the branch length protruding from the tubular sheath. An individually insulated conductor and/or a twin or multi-conductor insulated cable may also be enclosed within the tubular sheath. In a cable harness incorporating the multi-conductor cable at least some of the conductors of the length or lengths of tape cable and/or of the branch length or lengths of tape cable are electrically connected to insulated terminal leads.

30 Claims, 4 Drawing Figures

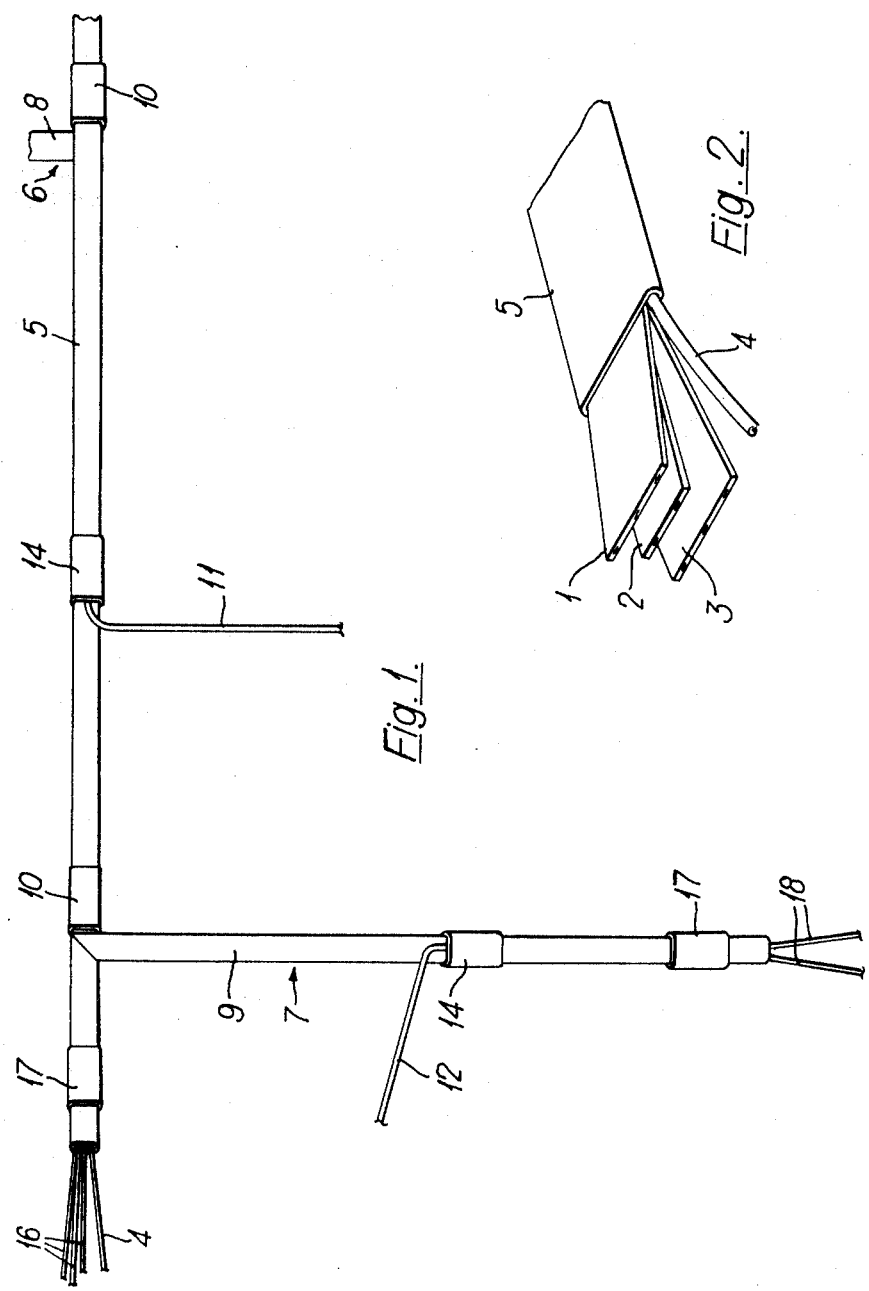

MULTI-CONDUCTOR ELECTRIC CABLES

This invention relates to multi-conductor electric cables and especially, but not exclusively, to cables forming part of a cable assembly of the kind known as a cable harness, for use for example in motor vehicles and aircraft, in which a multi-conductor unit or two or more multi-conductor units is or are encased in a common protective sheath.

Objects of the invention are to provide an improved multi-conductor cable suitable for use in forming a cable harness and to provide an improved method of making the multi-conductor cable. The invention also includes an improved cable harness incorporating the improved multi-conductor cable.

In accordance with the invention the improved multi-conductor cable comprises at least one length of tape cable enclosed in a heat-shrunk tubular sheath of insulating material and, electrically connected to said length or at least one of said lengths of tape cable at one location or at each of a number of longitudinally spaced locations, at least one other length of tape cable (hereinafter referred to as a branch length of tape cable) whose free end protrudes from the tubular sheath.

The term "tape cable" as used herein means cable comprising two or more conductors arranged side by side and embedded in a flexible tape of insulating material of a thickness small in comparison with its width. The form of tape cable preferred for use in accordance with the present invention is that known as a ribbon cable, in which each conductor is a metal ribbon arranged with its major transverse axis parallel to the major transverse axis of the cable.

A heat-shrunk tubular sheath is a sheath formed from thermally shrinkable insulating tubing which is caused to shrink by the application of heat and grip the length or lengths of tape cable which it encloses. Such a heat-shrunk tubular sheath is resistant to weather and mechanical abrasion and has a relatively high tensile strength.

At least one branch length of an individually insulated conductor, preferably of substantially circular cross-section, is electrically connected to said length or at least one of said lengths of tape cable at one location or at each of a number of longitudinally spaced locations with its free end protruding from the tubular sheath.

In addition to comprising, as an essential element, at least one length of tape cable, the multi-conductor cable may also include one or more than one individually insulated conductor of circular or non-circular cross-section and/or one or more than one twin or multi-conductor insulated cable enclosed within the tubular sheath. The or each individually insulated conductor and/or each conductor of the or each twin or multi-conductor insulated cable preferably has a greater load carrying capacity than the conductors of the length or lengths of tape cable.

The heat-shrunk tubular sheath may comprise a single tube of insulating material extending over substantially the whole length of the cable but, with a view to accommodating for the or each branch length of tape cable, the tubular sheath is preferably built up of several individual lengths of insulating tubing connected end to end. Connection between two such adjoining individual lengths of tubing may be effected by arranging for each individual length of tubing to overlap or be overlapped by its adjoining individual length or lengths of tubing but preferably it is effected by means of a short length of tube that overlaps or is overlapped by the neighboring end of each individual length of tubing which it interconnects. The overlaps between individual lengths of tubing, or between individual lengths of tubing and short connecting lengths of tube, are preferably bonded by an adhesive.

Where the heat-shrunk tubular sheath is built up of several individual lengths of insulating tubing the or a branch length of tape cable preferably protrudes lengthwise along the cable from between the neighboring ends of two adjoining individual lengths of tubing. At least a major part of the branch length of tape cable, or of each of some or all of the branch lengths of tape cable, is preferably itself enclosed in a heat-shrunk tubular sheath of insulating material which may extend beneath the short length of tube overlapping or overlapped by the neighboring end of such individual length of tubing which it interconnects or beneath the overlapping end of one of two adjoining individual lengths of tubing.

Where the multi-conductor cable comprises two or more lengths of tape cable, the lengths are preferably assembled face to face so that the cable is of a flattened cross-section and the branch lengths of tape cable, and of individually insulated conductor when present, preferably protrude from one or both of the wider faces of the sheath. Although it is preferred to arrange for each of the branch lengths of tape cable to have the same number of conductors as the length of tape cable to which it is electrically connected, each of some or all of the branch lengths of tape cable may have fewer conductors than the associated length of tape cable.

According to another aspect of the invention there is provided an improved cable harness comprising at least in part a multi-conductor cable in accordance with the present invention, some or all of the conductors of the length or lengths of tape cable and/or of the branch length or lengths of tape cable being electrically connected to insulated terminal leads, preferably of substantially circular cross section.

Preferably the insulation of each terminal lead is of a distinctive color or carries marking for identifying the function of the cable conductor to which it is connected.

The invention also includes an improved method of making a multi-conductor cable, which method comprises electrically connecting to a length of tape cable or to at least one of a number of lengths of tape cable at one location or at each of a number of longitudinally spaced locations at least one branch length of tape cable; applying over the length or lengths of tape cable a tubular sheath of heat-shrinkable insulating material; arranging for the free end of the or each branch length of tape cable to protrude from the sheath; and subjecting the sheathed assembly to sufficient heat to cause the tubular sheath to shrink and grip the length or lengths of tape cable.

Preferably two or more lengths of tape cable are arranged face to face to form an assembly of flattened cross-section and the or each branch length of tape cable is connected to one or more of the lengths of tape cable in such a way that its free end protrudes from a wider side of the sheath.

The tubular sheath may be applied to the length or lengths of tape cable by drawing a single tube of heat-shrinkable insulating material over the assembly and arranging for the or each branch length of tape cable to protrude through a slit in the tube but it is preferably formed by applying over the assembly several individual lengths of insulating tube arranged end to end with the ends of adjoining individual lengths of tubing overlapping one another, or overlapping or being overlapped by the ends of a short length of insulating tubing, the or each branch length of tape cable being arranged to protrude from between overlapping ends of adjoining lengths of tubing. Preferably the overlapping ends of the lengths of tubing are secured together by adhesive, which is preferably a heat-sensitive adhesive that is activated by the heat applied to heat shrink the sheath. The adhesive may be applied to the underlying of the two overlapping ends of adjoining lengths of tubing as a tape or in a liquid form. In both cases the tubular sheath is preferably of plasticized polyvinyl chloride.

When electrically connecting a branch length of tape cable to a length of tape cable the branch length may be arranged to lie substantially parallel to the length of tape cable and to be electrically connected thereto, for instance by spot welding or by an insulation-piercing crimp, adjacent to one of its ends. Preferably to strengthen the electrical connection between a branch length of tape cable and the associated length of tape cable in order to reduce the risk of damage to the connection when the branch length is manipulated, after the branch length has been electrically connected to the length of tape cable it is folded at least partially around the length or lengths of tape cable before it is arranged to extend lengthwise with respect to the length or lengths of tape cable. In one method of so strengthening an electrical connection the branch length of tape cable is folded adjacent the connection about a line extending at approximately 45° to the axis of the cable, is wrapped at least partially around the length or lengths of tape cable, and is then folded about a line substantially parallel to the first fold in such a way that the branch length of tape cable extends lengthwise along the length or lengths of tape cable.

Preferably the part of the or each branch length or group of branch lengths of tape cable protruding from the sheath has a tube of heat-shrinkable insulating material applied over it before heat is applied to the sheath and tube or tubes to cause them to shrink.

Where an insulated terminal lead is to be connected electrically to an end of a conductor of a length of tape cable or to a branch length of tape cable preferably an exposed end of the lead is connected to the conductor at a point spaced from the extreme end of the conductor, heat-sensitive adhesive is applied over the end of the tape cable and the overlying insulated terminal lead, a length of heat-shrinkable tubing is applied over the end of the sheath, the connection so formed and the applied adhesive, and heat is applied to shrink the tubing and cause the adhesive to activate and form an effective moisture-tight seal at the end of the sheath.

The invention will be further illustrated by a description, by way of example, of a preferred form of cable harness and of the preferred methods of connecting a branch cable and insulated terminal lead to a multi-conductor cable to form the cable harness with reference to the accompanying drawings, in which:

FIG. 1 is a diagrammatic representation of the cable harness,

FIG. 2 is a perspective fragmental view of the multi-conductor cable of the harness, FIG. 3 (a to d) illustrates the stages in the method of connecting a branch length of tape cable to the cable shown in FIG. 2.

Figures 3, 4:
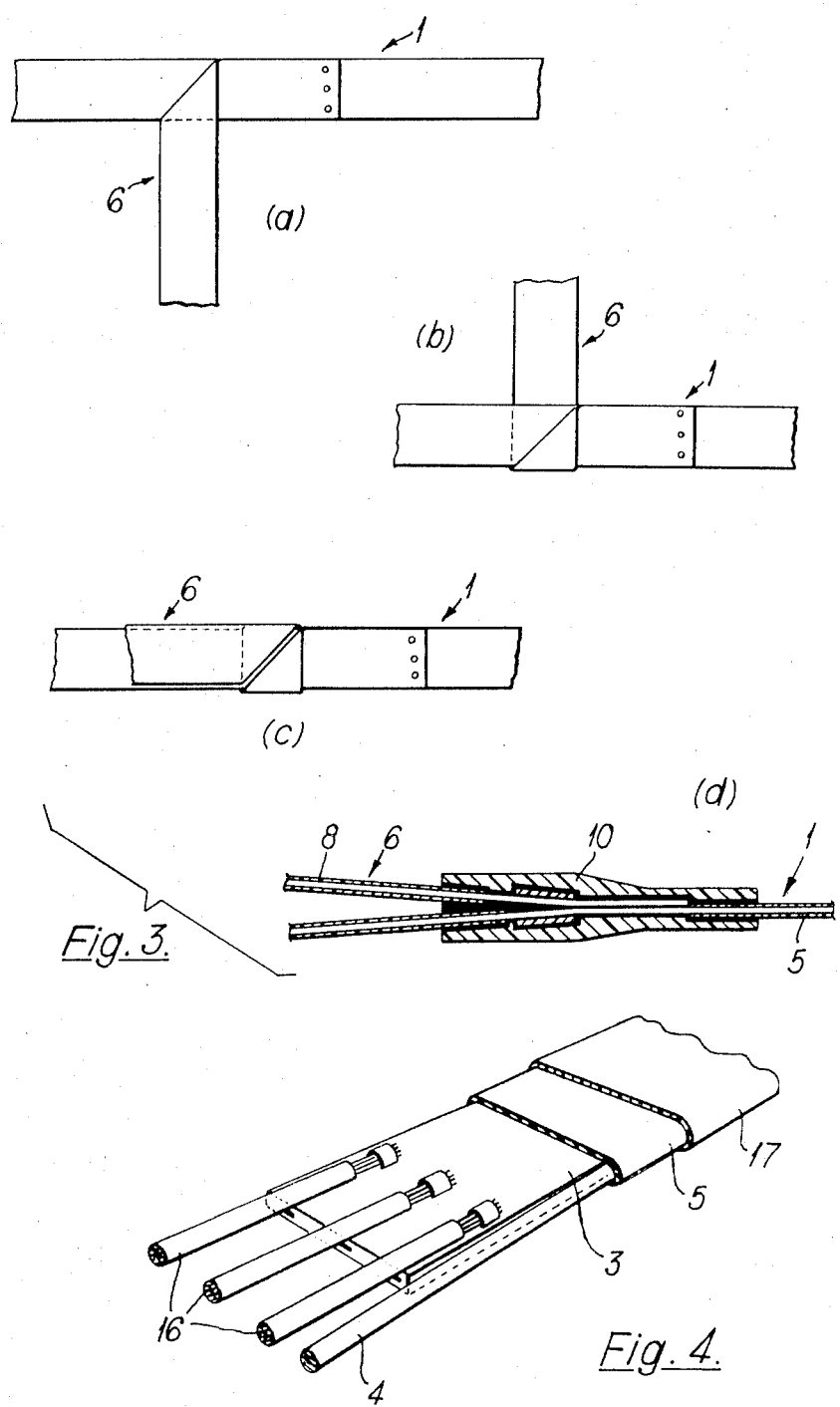
FIG. 4 is a perspective fragmental view of an end of the cable shown in FIG. 2 with insulated terminal leads connected to it.

Referring to FIGS. 1 and 2 the harness includes a multi-conductor cable comprising three tape cables 1, 2 and 3 assembled face to face and an individually insulated conductor 4, the cables and conductors being enclosed in a heat shrunk tubular sheath 5 of plasticized polyvinyl chloride. The sheath 5 is built up of several lengths of heat shrunk tubing arranged end to end. Electrically connected to the conductors of the tape cables 1 and 2, respectively, at longitudinally spaced locations along the length of the cable and protruding between neighboring ends of adjoining lengths of heat shrunk tubing are branch lengths 6 and 7 of tape cable, each branch length 6, 7 having a heat shrunk tubular sheath 8, 9 comprising several lengths of plasticized polyvinyl chloride tubing arranged end to end. Heat shrunk sleeves 10 of plasticized polyvinyl chloride overlie the electrical connections between the cable and branch lengths 6, 7 and the neighboring ends of the lengths of heat-shrunk sheath 5.

Between the longitudinally spaced locations at which the branch lengths 6 and 7 are connected a branch length 11 of an individually insulated conductor of substantially circular cross-section passes between neighboring ends of adjoining lengths of heat shrunk tubing of the sheath 5 and its conductor is electrically connected to one of the conductors of tape cable 2 by an insulation-piercing crimp. A branch length 12 of a similar individually insulated conductor of substantially circular cross-section passes between neighboring ends of adjoining lengths of heat shrunk tubing of the sheath 9 and its conductor is electrically connected to one of the conductors of the branch length 7 of tape cable by an insulation-piercing crimp. The electrical connections between the insulated conductors 11 and 12 and the cable and branch length 7 are each enclosed in a heat shrunk sleeve 14 of plasticized polyvinyl chloride.

At one end of the multi-conductor cable insulated terminal leads 16, each of substantially circular cross-section, are electrically connected to the conductors of tape cable 3 by insulation-piercing crimps, the connections and the protruding end of the insulated conductor 4 being enclosed in a heat shrunk sleeve 17 of plasticized polyvinyl chloride. Insulated terminal leads 18, each of substantially circular cross-section, are electrically connected to the conductors of the branch length 7 of tape cable at its free end by insulation-piercing crimps, these electrical connections being enclosed in a heat shrunk sleeve 17 of plasticized polyvinyl chloride.

As will be seen on referring to FIG. 3 (a to d) in electrically connecting the conductors of a branch length 6 of tape cable to the conductors of a tape 1 of a multi-conductor cable in accordance with the invention, the branch length is arranged to overlie and extend substantially parallel to the tape cable and the conductors of the branch length are electrically connected to the underlying conductors of the tape cable by insulation-piercing crimps. The branch length 6 of tape cable is folded adjacent the connections about a line extending at approximately 45° to the axis of the cable (FIG. 3a) and the branch length is then wrapped partially around the lengths of tape cable of the multi-conductor cable (FIG. 3b). The branch length 6 is then folded about a line substantially parallel but in the opposite sense to the first fold in such a way that the branch length extends lengthwise along the lengths of tape cable (FIG. 3c). A heat shrinkable sleeve 10 of plasticized polyvinyl chloride, that has previously been applied to the multi-conductor cable, is now drawn over the electrical connections between the branch length 6 and tape cable 1 so that is overlaps the neighboring ends of the lengths 5 of polyvinyl chloride tubing of the sheath 5 and the sheath 8 of the branch length — to which heat sensitive adhesive has previously been applied — and heat is applied to the sheaths and sleeve to cause them to shrink (FIG. 3d) and to cause the resin to activate and form a moisture-tight seal.

As will be seen on referring to FIG. 4, in terminating an end of the multi-conductor cable individually insulated terminal leads 16 of substantially circular cross-section are arranged to overlie the end of the tape cable 3 and are each electrically connected to a conductor of the tape cable at a point spaced from its extreme end by an insulation-piercing crimp. Heat-sensitive adhesive is applied over the end of the tape cable 3 and the overlying insulated terminal leads and a heat shrinkable sleeve 17 of plasticized polyvinyl chloride is applied over the end of the sheath 5, the connections so formed and the applied adhesive. Heat is applied to shrink the sleeve 17 and cause the adhesive to activate and form an effective moisture-tight seal at the end of the sheath.

In an alternative method of terminating an end of the multi-conductor cable of the present invention to form a cable harness a multi-pin connector is directly connected to conductors of the length or lengths of tape cable, preferably using insulation-piercing electrical connectors of a known kind.

The cable harness of the present invention is neat, compact and substantially water-tight and, by virtue of its construction, can be readily secured to the bodywork of a motor vehicle or an aircraft.

What I claim as my invention is:

1. A multi-conductor cable comprising at least one length of tape cable enclosed in a heat-shrunk tubular sheath of insulating material and, electrically connected to said length or at least one of said lengths of tape cable at at least one of a number of longitudinally spaced locations, at least one branch length of tape cable whose free end protrudes from the tubular sheath.

2. A multi-conductor cable as claimed in claim 1, wherein at least a major part of the branch length of tape cable, or of at least one of the branch lengths of tape cable, is enclosed in a heat-shrunk tubular sheath of insulating material.

3. A multi-conductor cable as claimed in claim 1, wherein at least one branch length of an individually insulated conductor is electrically connected to said length or at least one of said lengths of tape cable at at least one of a number of longitudinally spaced locations with its free end protruding from the tubular sheath.

4. A multi-conductor cable as claimed in claim 1 which comprises at least two lengths of tape cable, wherein the lengths are assembled face to face so that the cable is of a flattened cross-section and the branch lengths of tape cable protrude from at least one of the wider faces of the sheath.

5. A multi-conductor cable as claimed in claim 1, wherein the or each branch length of tape cable has the same number of conductors as the length of tape cable to which it is electrically connected.

6. A multi-conductor cable as claimed in claim 1, wherein the tubular sheath is built up of several individual lengths of insulating tubing connected end to end.

7. A multi-conductor cable as claimed in claim 6, wherein connection between two adjoining individual lengths of tubing is effected by a short length of tube that overlaps the neighboring end of each individual length of tubing which it interconnects.

8. A multi-conductor cable as claimed in claim 7, wherein overlaps between individual lengths of tubing and short connecting lengths of tube are bonded by an adhesive.

9. A multi-conductor cable as claimed in claim 6, wherein each individual length of tubing at one of its ends overlaps or is overlapped by its adjoining individual length of tubing.

10. A multi-conductor cable as claimed in claim 9, wherein overlaps between individual lengths of tubing are bonded by an adhesive.

11. A multi-conductor cable as claimed in claim 6, wherein at least a major part of the branch length of tape cable, or of at least one of the branch lengths of tape cable, is itself enclosed in a heat-shrunk tubular sheath of insulating material which extends beneath the short length of tube overlapping and interconnecting the neighboring ends of two individual lengths of tubing.

12. A multi-conductor cable as claimed in claim 6, wherein the or a branch length of tape cable protrudes lengthwise along the cable from between the neighboring ends of two adjoining individual lengths of tubing.

13. A multi-conductor cable comprising at least one length of tape cable enclosed in a heat-shrunk tubular sheath of insulating material, at least one of the group consisting of individually insulated conductors, twin conductor insulated cables and multi-conductor insulated cables enclosed within said tubular sheath and, electrically connected to said length or at least one of said lengths of tape cable at at least one of a number of longitudinally spaced locations, at least one branch length of tape cable whose free end protrudes from the tubular sheath.

14. A multi-conductor cable as claimed in claim 13, wherein the or each conductor of the individually insulated conductor, twin or multi-conductor insulated cable has a greater load carrying capacity than the conductors of the tape cable.

15. A cable harness comprising at least in part a multi-conductor cable comprising at least one length of tape cable enclosed in a heat-shrunk tubular sheath of insulating material and, electrically connected to said length or at least one of said lengths of tape cable at at least one of a number of longitudinally spaced locations, at least one branch length of tape cable whose free end protrudes from the tubular sheath, at least some of the conductors of the tape cables being electrically connected to insulated terminal leads.

16. A cable harness as claimed in claim 15, wherein the connections between the insulated terminal leads and the conductors to which they are connected are enclosed in a length of heat shrunk tubing of insulating material bonded to the tubular sheath and to the insulation of the terminal leads to form an effective moisture-tight seal at the end of the sheath.

17. A cable harness as claimed in claim 15, wherein the insulation of each terminal lead carries a distinctive color for identifying the function of the cable conductor to which it is connected.

18. A cable harness as claimed in claim 15, wherein each terminal lead is of substantially circular cross-section.

19. A method of making a multi-conductor cable which comprises electrically connecting to at least one length of tape cable at at least one of a number of longitudinally spaced locations at least one branch length of tape cable; applying over the length or lengths of tape cable a tubular sheath of heat-shrinkable insulating material; arranging for the free end of the or each branch length of tape cable to protrude from the sheath; and subjecting the sheathed assembly to sufficient heat to cause the tubular sheath to shrink and grip the length or lengths of tape cable.

20. A method as claimed in claim 19, wherein the tubular sheath is applied to the length or lengths of tape cable by drawing a single tube of heat-shrinkable insulating material over the assembly and arranging for the or each branch length of tape cable to protrude through a slit in the tube.

21. A method as claimed in claim 19, wherein the tubular sheath is formed by applying over the length or lengths of tape cable several individual lengths of tube of heat-shrinkable insulating material, arranged end to end with the ends of adjoining individual lengths of tubing overlapping one another, and arranging for the free end of the or each branch length of tape cable to protrude from between overlapping ends of adjoining lengths of tubing.

22. A method as claimed in claim 19, wherein at least two lengths of tape cable are arranged face to face to form an assembly of flattened cross-section and the or each branch length of tape cable is connected to at least one of the lengths of tape cable in such a way that its free end protrudes from a wider side of the sheath.

23. A method as claimed in claim 19, wherein the or each branch length of tape cable is arranged to lie substantially parallel to the length of tape cable to which it is to be connected and the branch length is electrically connected thereto adjacent to one end of the branch length.

24. A method as claimed in claim 23, wherein after the branch length has been electrically connected to the length of tape cable it is folded at least partially around the length or lengths of tape cable before it is arranged to extend lengthwise with respect to the multi-conductor cable.

25. A method as claimed in claim 19, wherein after the branch length has been electrically connected to the length of tape cable it is folded adjacent the connection along a line extending at approximately 45° to the axis of the cable, is wrapped at least partially around the length or lengths of tape cable, and is then folded about a line substantially parallel to the first fold in such a way that the branch length of tape cable extends lengthwise along the multi-conductor cable.

26. A method as claimed in claim 19, wherein the part of the or each branch length of tape cable protruding from the sheath has a tube of heat-shrinkable insulating material applied over it before heat is applied to the sheath and tube to cause them to shrink.

27. A method as claimed in claim 19, wherein a cable harness is formed by electrically connecting an insulated terminal lead to a conductor of a length of tape cable at a point spaced from the extreme end of the conductor; applying a heat-sensitive adhesive over the end of the tape cable and the overlying insulated terminal lead; applying a length of heat-shrinkable tubing over the end of the sheath, the connection so formed and the applied adhesive; and applying heat to shrink the tubing and cause the adhesive to activate and form an effective moisture-tight seal at the end of the sheath.

28. A method of making a multi-conductor cable which comprises electrically connecting to at least one length of tape cable at at least one of a number of longitudinally spaced locations at least one branch length of tape cable; applying over the length or lengths of tape cable several individual lengths of tube of heat-shrinkable insulating material, arranged end to end with the ends of adjoining individual lengths of tubing being overlapped by the ends of a short length of tubing of heat-shrinkable insulating material to form a tubular sheath; arranging for the free ends of the or each branch length of tape cable to protrude from between overlapping ends of adjoining lengths of tubing; and subjecting the sheathed assembly to sufficient heat to cause the tubular sheath to shrink and grip the length or lengths of tape cable.

29. A method as claimed in claim 28, wherein the overlapping ends of adjoining lengths of tubing are secured together by adhesive.

30. A method as claimed in claim 29, wherein the adhesive is a heat-sensitive adhesive that is activated by the heat applied to heat shrink the sheath.

* * * * *